July 7, 1959 W. R. FIEROH 2,893,468
PLASTIC HEAT-SEALING APPARATUS
Filed Aug. 31, 1955 2 Sheets-Sheet 1

INVENTOR.
William R. Fieroh
BY
Attorney

July 7, 1959
W. R. FIEROH
2,893,468
PLASTIC HEAT-SEALING APPARATUS
Filed Aug. 31, 1955
2 Sheets-Sheet 2
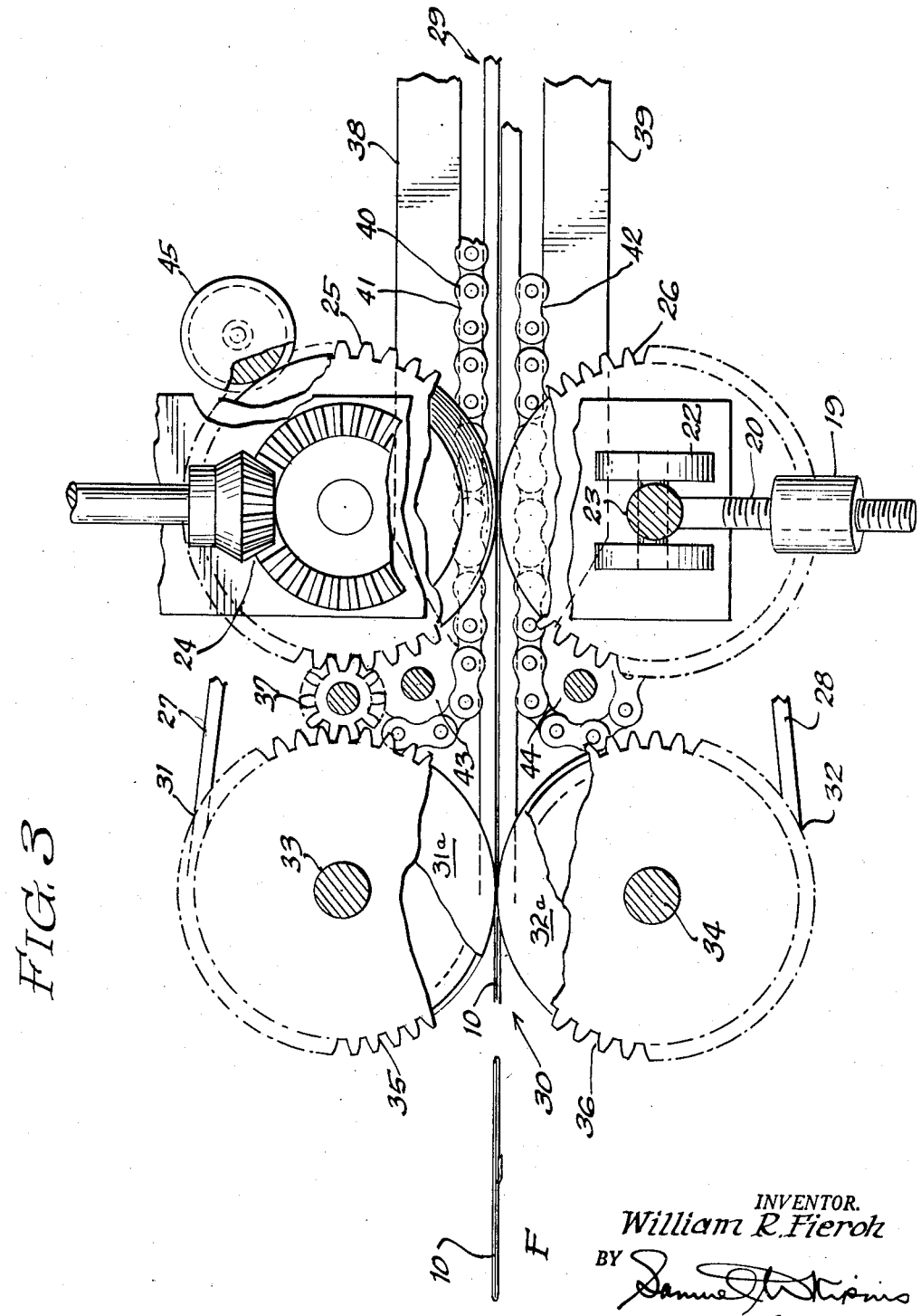
FIG. 3
INVENTOR.
William R. Fieroh
BY
Attorney United States Patent Office 2,893,468
Patented July 7, 1959

2,893,468

PLASTIC HEAT-SEALING APPARATUS

William R. Fieroh, Chicago, Ill.

Application August 31, 1955, Serial No. 531,671

14 Claims. (Cl. 154—42)

This invention relates to the heat-sealing of synthetic thermoplastic sheets and the like by continuous or roller type apparatus.

A primary purpose of the invention is to overcome difficulties heretofore encountered when variable thicknesses or variable laminations of sheeting had to be heat-sealed. An example is the closing of plastic containers by heat-sealing. Here the sealing rollers normally engage two thicknesses of the sheeting, but they encounter added thickness of such material in areas where the sheeting was previously overlapped; and they may encounter additional increases in thickness when a so-called gusset bag or the like is involved where the rollers periodically roll over two, three and four or more thicknesses of sheeting. Under such conditions the heat-sealing operations performed by apparatus now known and used tends to fluctuate in rapid and complex cycles, mostly rather irregular. This in turn leads not only to crimped or wavy seals, which are not always welcome, but often to imperfect seals at points where excessive or insufficient sealing action momentarily occurred because of a so-called skipping and the like.

I have discovered weight-biased roller pressure means capable of sealing action without any cyclic irregularity such as skipping; in fact practically without any vibration or wave action at the sealing point. Also, in the new apparatus a heat-seal can be produced which is entirely free of crimping and practically free of all waviness and the like, by means of an auxiliary pressure rolling operation after the heat sealing. Such operation is impossible with the deep crimping and other features typical of prior art machines. The preferred apparatus also uses a special conveyor belt and roller device, providing balanced supporting, feeding and guiding action for the material while it is heat-sealed, so as to further aid in producing a smooth and regular seam. Still further refinements will be explained hereinafter. The invention will be understood more clearly upon a study of the following detailed description of a preferred embodiment. In the drawing:

Figure 3 is a still more complete, sectional view of the same apparatus, the section being taken along lines 3—3 in Figure 2.

Figure 1:
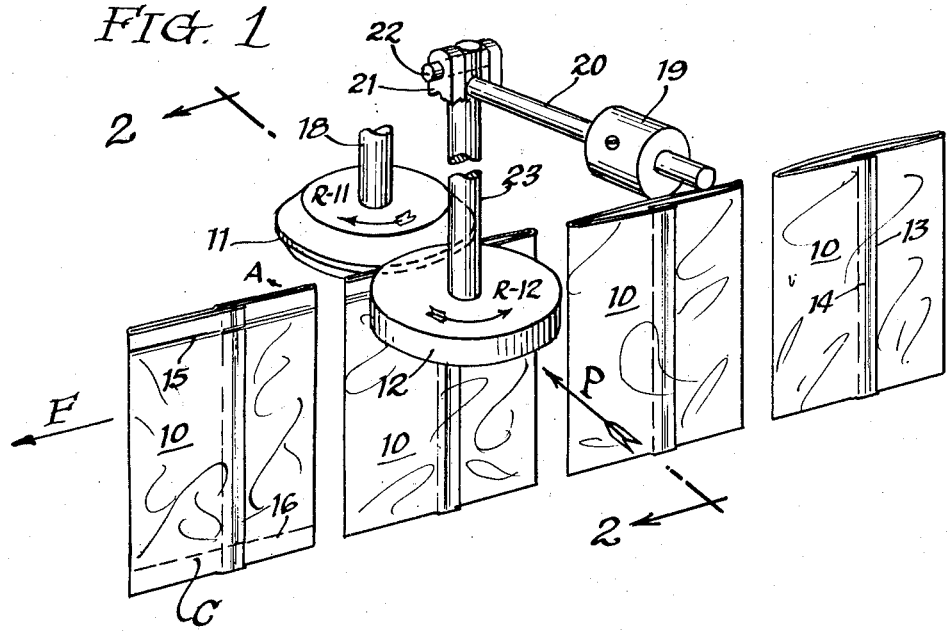
Figure 1 is a fragmentary, perspective view of the new heat-sealing apparatus.
Figure 2:
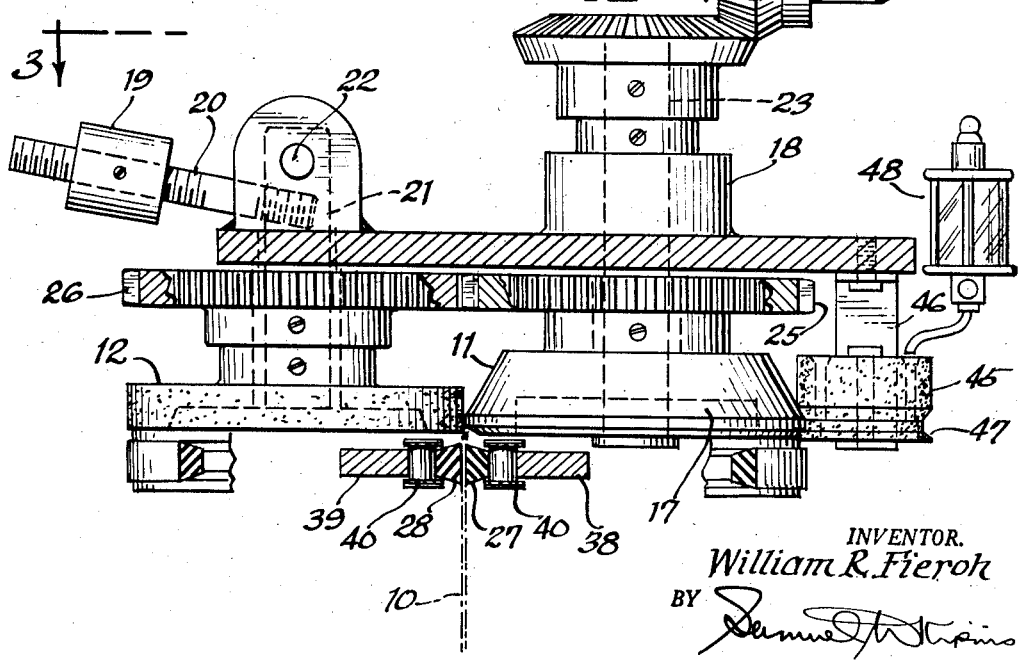
Figure 2 is a more complete, sectional view of the same apparatus, the section being taken along lines 2—2 in Figure 1.

Referring first to Figures 1 and 2:

A series of thermoplastic sheet units, for instance container bags 10, are heat-sealed between a hot roll 11 and a cold roll 12. In the example shown each bag is formed of a single rectangular piece of the plastic sheeting, two ends of which have been overlapped at 13 and combined by a vertical heat-seal 14 along the overlap 13. Each unit 10 arriving in the present machine, as shown, forms a sleeve open at both upper and lower ends. It may be assumed that the present machine, as shown, is used to make what will be a bottom seal 15, across the vertical seal 14. Of course the units 10, as shown, have the area of the seal 15 uppermost while they pass through the machine; they can later be reversed for filling and there can then be made a top seal 16 similar to the bottom seal 15, by means of the same machine as shown. The roller 11 is heated by a suitable electric resistance heating disc 17 or the like, under the control of suitable thermostats or the like (not shown).

Both top and bottom seals 15, 16 are made in and through two thicknesses of the sheet material, except in the overlapped area 13 where they are made through three thicknesses of the material; and in the region of the preformed vertical seal 14 the top and bottom seals 15, 16 are made in three thicknesses of material with additional irregularity due to the preformed seal. These variations are very significant for the heat-sealing process which occurs in material 10 between rollers 11, 12 and which causes molecular changes in the synthetic thermoplastic material of the sheets 10. The exact nature of the molecular changes depends on the type of plastic material to be sealed. Without extended discussion of the chemistry involved, it may be noted that all of said materials are very sensitive to the degree and manner of applying heat, sealing pressure, forward feeding tension and other forces, in the heat-sealing area. Even slight variation of any of the forces and conditions prevailing in the sealing area is apt to produce major changes in the heat-seal produced. Major changes of thermal and plastic flow conditions occur at the transition from two to three sheets and vice versa; but even in the absence of such major changes, the heat-sealing devices now in use tend to produce various fluctuations of heat flow and plastic flow, at and around the sealing point, because of various interferences between sealing pressure P, feeding tension F, plastic to metal adhesion A and other complicating influences. In the presence of variation of thickness as at 13 and/or 14, irregularities such as the aforementioned skipping and insufficient sealing have often occurred. In other serious cases sheet material has even been burned through and severed rather than sealed.

I have discovered the fact that these difficulties are largely due to the conventional spring loading for one of the sealing rollers 11, 12. A yieldable mounting for one of these rollers is required for the purpose of the feeding variable thicknesses through the sealing area; but such yielding as is typical for the conventional loading spring tends to cause cyclic variations of sealing pressure P, which are conducive to very irregular flow of the heat-softened material.

In the present machine one of the heat-sealing rollers, the hot roll 11, is rotatably mounted in a stationary location, as by shaft and bearing means 18. The cooperating roller, the cold roll 12, is biased toward the other roll by a counterweight 19. The advantage of this form of biasing is that the static sealing pressure P can be kept uniform regardless of the required degree of yielding and at the same time, vibratory changes of such pressure can be fully suppressed. For the latter purpose the lever arm 20 supporting the counterweight is made short and the mass of the weight very large in comparison with the mass of plastic material 10 being heat-sealed at any one time. Of course the weight 19 is preferably adjustable on and along the lever arm 20. That arm, as shown, forms a bell crank together with the shaft and bearing structure 21 of the cold roll 12; the bell crank being pivoted in a journal 22 for swinging in a plane radial of the cooperating hot roll 11.

It is necessary also to minimize irregularities of unit feed F and adhesion A; these forces being interrelated with the pressures P in various manners. It is further necessary to achieve the control over all these forces in a simple and economical manner, practically by mechanical correlation of the feeding force F with the rotation R–11, R–12 of the sealing rollers 11, 12. For these purposes I provide a primary drive shaft, the hot roll shaft 23, with suitable power drive means 24 and with a spur gear 25, fast on said shaft. I provide a secondary spur gear 26, fast on the secondary or cold roll shaft 21.

The pitch diameters of the gears 25, 26 are suitably coordinated with the diameters of the rollers 11, 12 to produce uniform roller motion in the heat-sealing area. The pitch or size of the teeth of the gears 25, 26 is made large, thereby minimizing the effect of variations of backlash forces inherently occurring between the gears 24, 25. I found that it is more important to minimize variations of the backlash forces than to minimize the absolute values of backlash forces which are present. I therefore prefer using coarse gears 25, 26; for instance gears with only twelve to eighteen teeth per inch of diameter, when working on the usual thin sheet material of only a few thousandths of an inch thickness. Typical diameters of the sealing gears and corresponding sealing rollers may be about 2½ inch and 4½ inch. The expression "coarse gears" is employed herein, as usual, to designate diametrical pitch values in a range for which the indicated values are illustrative. It will be seen that the corresponding, radial dimensions of the gear teeth equal many times the combined thicknesses of as many as four layers of plastic sheeting to be heat-sealed, thereby minimizing the variation of backlash which occurs when changing for instance from two to four thicknesses of sheeting.

Referring now to Figures 2 and 3:

The preferred form of my apparatus as shown comprises conveyor means for the sheet material to be heat-sealed, and particularly a pair of flexible V-belts 27, 28 disposed respectively on the sides of the rollers 11, 12. These V-belts have their wide and flat sides facing one another and almost completely in contact with one another, adjacent the area of heat-sealing contact between the rollers 11, 12 and in a horizontal area extending longitudinally of the machine from said heat-sealing area both backwards to a receiving area 29 and forward to a final treatment or resealing area 30, so that the series of bags 10 can be conveyed through the machine by these belts. It may further be noted that the two belts are located directly below the rollers 11, 12 so that only a very short vertical extension of the bags 10 from the belts to the sealing rollers is required, thereby minimizing irregularities due to gravitational or other distortion of the thin and flexible sheet material. Furthermore correlation of the feeding F with the roller rotation R–11, R–12 is safeguarded by means of an actuator mechanism for the belts 27, 28 comprising a pair of belt pulleys 31, 32, located respectively on the sides of the belts 27, 28 and conventionally adapted to frictionally engage and positively move the respective belts in a relatively slow movement. Mounted immediately above each pulley 31, 32 is a final press roll 31a, 32a, respectively (Fig. 3). The pulleys and the final press rolls in turn are fast on shafts shown respectively at 33, 34, which also have respective gears 35, 36 mounted thereon and in mesh with each other, and are gear actuated in conjunction with the heat roller drive, as by an intermediate pinion 37, in such manner as to insure uniform motion of the two belts, at a speed uniform with that of the heat-sealing rollers in the heat-sealing zone.

Since the containers to be heat-sealed represent a positive weight, mainly after filling, the two belts 27, 28 gripping the containers must be pressed against one another by a positive force. This is achieved by means of a pair of pressure bars 38, 39, installed respectively on the sides of the rollers 11, 12 at the elevation of the belts and adapted to press the belts against one another; a series of roller bearing members 40 being interposed between each pressure bar and the corresponding belt in order to minimize friction. I have found it particularly practical to provide such roller bearing elements by means of a pair of ordinary flat link power transmission chains 41, 42 installed respectively on the sides of the rollers 11, 12 at the elevation of the belts and pressure bars. Sprocket means 43, 44 are of course provided for such chains and it is sometimes desirable although not essential that such sprockets be rotated in conjunction with the heat-sealing rollers and final press rolls 31a and 32a and the corresponding gears, by further gear means not shown.

Depending upon the exact thermoplastic material, different sealing rollers 11, 12 may be preferred. However, I have found that a majority of the thermoplastic materials now available and commonly used, including for instance those generally known as Pliofilm (rubber hydrochloride), Vinylite, saran, polyethylene, Koroseal, etc. are substantially most efficiently heat-sealed by the present method and particularly by that form thereof wherein the hot roll 11 has a surface of brass or bronze or similar metal whereas the cold roll 12 has a surface of rock-hard felt or asbestos felt or the like; the felt surface 12 being preferably wide in comparison with the effective metal surface 11, by making the cold roll 12 cylindrical but making the hot roll 11 conically beveled or double beveled as shown. One problem occurs, relating to a tendency of the heat-sealing material to adhere to the hot roll after sealing. I found however that this can be controlled and easy peeling off without special effort other than that of the belts 27, 28 can be achieved by keeping the metal surface 11 covered with a thin film of a basically known release material such as silicone oil or other like lubricant or the like. This in turn is most easily achieved by providing a release oil feed roller 45 on a suitable bearing structure 46; said roller idling in contact with the hot roll 11 and desirably having a contour matching that of the hot roll as clearly shown at 47. The feed roller may be made of suitable materials such as oilite powder metal or felt. It is kept saturated with oil by a suitable oil feed device 48, the details of which require no special description herein.

By means of the cooperation of the specially and stably weight-biased roll 12, the heat roll 11, the coordinated conveyor belts 27, 28 and the release oil feed roll 45, a very smooth and regular heat-seal can be formed in spite of variations of plastic thickness and other unavoidable irregularities. By the additional and final press rolls 31a, 32a, which are desirably located at a point where the heat-seal is still somewhat plastic although no longer liquid, the contour of the heat-seal can be made practically uniform and free from any wave or wrinkle or the like.

Various modifications of course are possible. I claim:

1. Apparatus for continuously heat-sealing thermoplastic sheet material, comprising a heater and back-up roll assembly formed by at least two rolls, means for continuously feeding thermoplastic sheeting to be sealed through the space between the two rolls; a stationary bearing for one of the rolls; a movable bearing mounting the other roll for swinging movement in a plane substantially radial of the first-named roll; a counterweight on the other roll mounting for yieldingly gravitationally biasing said other roll in said plane against the thermoplastic sheeting material and the first-named roll and drive means for rotating said rolls.

2. Apparatus as described in claim 1 additionally comprising means arranged closely adjacent to the rolls for applying pressure to the thermoplastic sheet material portions heat-sealed between the first and second rolls.

3. Apparatus as described in claim 1 wherein the counterweight is adjustable.

4. Apparatus as described in claim 1 wherein the heater roll has a double beveled rim of relatively hard material and the back-up roll has an approximately cylindrical and relatively wide rim of relatively soft material.

5. Apparatus as described in claim 1 wherein the rim of the heater roll is made of highly heat-conductive metal such as bronze, the apparatus additionally comprising means for applying a release fluid to said rim.

6. Apparatus as described in claim 5 wherein the means for applying release fluid comprise a porous roller in surface contact with the heater roll and a fluid feeder adapted to supply release fluid to the porous roller.

7. Apparatus as described in claim 1 wherein the back-up roll has a rim of substantially heat-resistant and heat-insulating material.

8. Apparatus as described in claim 7 wherein the back-up roll is journalled on said movable bearing.

9. Apparatus for continuously heat-sealing thermoplastic sheet material comprising two pairs of rolls, the rolls of each pair being adapted to engage and pressurize said material; a heater in at least one roll of one of said pairs; a V-belt arranged with flat and wide outer sides opposite one another and horizontally extending adjacent and slightly below the first pair of rolls, toward and away from the second pair of rolls; pulleys for the V-belts rotatable with the second pair of rolls so as to move the V-belts uniformly with the first pair of rolls; and means for rotating the two pairs of rolls.

10. Apparatus as described in claim 9 additionally comprising rigid means extending along and adjacent the V-belts and adapted to press the same together.

11. Apparatus as described in claim 10 additionally comprising means interposed between each V-belt and the corresponding means for pressing them together so as to minimize friction therebetween.

12. Apparatus as described in claim 11 wherein the means to minimize friction form part of a pair of chains extending along the corresponding V-belts.

13. Apparatus as described in claim 11 wherein each chain is adapted to be driven at a velocity corresponding with that of the corresponding V-belt so as to minimize friction between the same and the corresponding pressure means.

14. Apparatus as described in claim 9 additionally comprising an idler roller in contact with one of the rollers of the first pair; the contacting roller surface being metallic and the idler roller being adapted to distribute a liquid thereover for releasing the thermoplastic material therefrom.

References Cited in the file of this patent

UNITED STATES PATENTS

| | | |
|---|---|---|
| 1,329,069 | Bevier | Jan. 27, 1920 |
| 2,103,945 | Henley | Dec. 28, 1937 |
| 2,114,833 | Fincke | Apr. 19, 1938 |
| 2,568,094 | Smith | Sept. 18, 1951 |
| 2,591,383 | Spalding | Apr. 1, 1952 |
| 2,800,162 | Rohdin | July 23, 1957 |